3,085,072
ION EXCHANGE RESIN
Herbert Zima, Darmstadt, Germany, assignor to Rohm
 & Haas G.m.b.H., Darmstadt, Germany
No Drawing. Filed July 22, 1958, Ser. No. 750,101
Claims priority, application Germany July 31, 1957
15 Claims. (Cl. 260—2.2)

This invention relates to an ion exchange resin and to a method of preparing the same.

In accordance with the invention, ion exchange resins having a remarkable exchange capacity, particularly for cations of heavy metals, e.g., cations of metals of the eighth group of the periodic system as well as of silver, gold, thorium and uranium in the form of $UO_2^{++}$, are prepared by reacting a polymer of an acrylic acid ester containing chlorine in the ester group with an alkali or alkaline earth hydrosulfide for introducing thiol groups into the macromolecular compound.

The initial polymer, as indicated, may be prepared from any polymerizable ester of an acrylic acid containing chlorine in the ester group. Prominent among monomers suitable for the preparation of such polymers are chloromethylacrylate and chloromethylmethacrylate. The polymer may also be prepared by copolymerization of such an ester or mixture of such esters with one or more other polymerizable monomers having exchangeable groups, by copolymerization of one or more of the aforesaid monomers with a bifunctional or cross linking monomer such as divinylbenzene, i.e., a monomer containing two double bonds in the molecule, or by reacting a homopolymer or copolymer of a chlorine-containing acrylate with such a bifunctional monomer. In the preferred embodiment of the invention, the polymerization of the monomers and monomer mixtures referred to is carried out in a liquid medium which serves as a solvent or swelling agent, e.g., in acetone.

The alkali or alkaline earth hydrosulfide employed in the reaction with the polymer may be an alkali hydrosulfide such as potassium or sodium hydrosulfide, or magnesium hydrosulfide. The hydrosulfide is preferably brought into contact with the polymer by slow addition of the hydrosulfide, dissolved in an inert solvent such as absolute alcohol, while the polymer is in a dissolved or swollen state.

The macromolecular, thiol group-containing polymers thus obtained are generally insoluble resins whose capacity for being swollen by application thereto of swelling agents can be influenced by monomer interpolymerization or subsequent polymer cross linking reaction with a difunctional monomer, such as divinylbenzene. The polymers of the invention can readily be prepared in the form of granules, small beads and films.

The polymers of the invention have excellent exchange capacity for cations of heavy metals and particularly for separating uranyl and thorium ions from aqueous solutions thereof. They exhibit the phenomenon of electron exchange or electron transfer, known to be exhibited by several other exchangers as well, by which an exchange of ions is replaced by an oxidation-reduction reaction.

The advantages and utility of the resin and method of the invention will become further apparent from the following examples included to illustrate the best modes now contemplated of practicing the invention.

*Example 1*

60 g. (0.41 mole) chloromethylmethacrylate were dissolved in 240 g. acetone and polymerized at 50° C. under nitrogen after addition thereto of 0.24 g. thioglycolic acid and 0.36 g. azodiisobutyric acid dinitrile. The polymer solution was diluted with 840 g. acetone and vigorously agitated at about 50° C. while slowly adding a solution of 36 g. (0.5 mole) potassium hydrosulfide in 800 ml. absolute alcohol. The reaction product separated as a flocculent precipitate, the reaction being finished in three hours.

The resinous reaction product was filtered off, treated with acetone and 1 N hydrochloric acid to remove the potassium ions, washed with water until the resin showed a neutral reaction, and dried at about 50° C. under a vacuum. Analysis indicated a sulfur content of 22.0% in the resin.

25 g. of the polythiolmethylmethacylate thus obtained were pulverized and brought into contact, at room temperature, with 1 liter of aqueous uranyl acetate solution having a uranium content of 0.55%. The resin settling on the bottom of the vessel was distributed throughout the solution by intermittent stirring. After twenty-four hours the resin was separated from the solution and the latter was found, on analysis, to contain 0.16% uranium in the form of uranyl acetate.

It follows that 25 g. polythiomethylmethacrylate had adsorbed 3.9 g. uranium in the form of the uranyl ion under the conditions described.

*Example 2*

60 g. (0.41 mole) chloromethylmethacrylate dissolved in 240 g. acetone were reacted with 0.24 g. thioglycolic acid and 0.36 g. azodiisobutyric acid dinitrile and polymerized under nitrogen at 60° C. After forty hours the acetone and residual monomer were distilled off under a vacuum whereupon 40 g. of dry polymer remained.

The remaining dry polymer was dissolved in 840 ml. acetone and vigorously agitated at about 50° C. while slowly adding a solution of 28.8 g. (0.40 mole) potassium hydrosulfide in 800 ml. absolute alcohol. Upon dropwise addition of the potassium hydrosulfide solution, a white resin was precipitated, which was separated after the reaction was finished. The separated precipitate was washed with acetone, 1 N hydrochloric acid, and finally with water until it showed a neutral reaction and then dried under vacuum. Analysis indicated that the dry resin contained 18.4% sulfur.

25 g. of the polythiolmethylmethacrylate thus prepared were brought into contact in the form of a powder with an aqueous uranyl acetate solution containing 0.55% uranium under the conditions described in Example 1. After separation of the resin, the solution was found to contain 0.31% uranium.

It follows that 25 g. polythiolmethylmethacrylate had adsorbed 2.4 g. uranium in the form of the uranyl ion under the conditions described.

*Example 3*

56 g. of polymer beads having diameters of from 0.3 to 0.43 mm. and prepared from chloromethylmethacrylate upon addition of 0.5% divinylbenzene, were swollen in 800 ml. acetone for twelve hours at about 70° C. A solution of 33.6 g. potassium hydrosulfide in 750 ml. absolute alcohol was thereupon added slowly while stirring vigorously. After the addition of potassium hydrosulfide was complete the temperature was maintained at about 50° C. for an additional four hours.

The beads, which were dyed red after the reaction, were separated from the solution and washed with one part alcohol and one part acetone. To remove potassium ions therefrom, the resin was treated with 1 N hydrochloric acid and then with water until it was washed to a neutral reaction product. Analysis showed that after drying under vacuum, the beads had a sulfur content of 11.2%.

50 g. of the resin thus prepared were brought into contact with 1 liter of an aqueous chloroplatinic acid solution having a platinum content of 0.510% under the conditions described in Example 1. After separation of the resin, the solution was found to have a platinum content of only 0.155%.

It follows that 50 g. of the resin had adsorbed 3.55 g. platinum under the conditions described.

It is to be expected that numerous modifications will readily become apparent to those skilled in the art upon reading this description. All such modifications are intended to be included within the scope of the invention as defined in the appended claims.

I claim:

1. An ion exchange resin prepared by contacting, at about 50° C., a member selected from the group consisting of homopolymers of acrylate esters of a chlorinated aliphatic alcohol and copolymers of said esters with divinyl benzene, with a member selected from the group consisting of alkali and alkaline earth hydrosulfides in such amounts that about equimolar quantities of chlorine radical and hydrosulfide radical are present, whereby chlorine radicals in the alcohol moiety of the ester are replaced by mercapto groups.

2. An ion exchange resin prepared by contacting, at about 50° C., a homopolymer of chloromethylacrylate with a member selected from the group consisting of alkali and alkaline earth hydrosulfides in such amounts that about equimolar quantities of chlorine radical and hydrosulfide radical are present, whereby chlorine radicals in the alcohol moiety of the ester are replaced by mercapto groups.

3. An ion exchange resin prepared by contacting, at about 50° C., a homopolymer of chloromethylmethacrylate with a member selected from the group consisting of alkali and alkaline earth hydrosulfides in such amounts that about equimolar quantities of chlorine radical and hydrosulfide radical are present, whereby chlorine radicals in the alcohol moiety of the ester are replaced by mercapto groups.

4. An ion exchange resin prepared by contacting, at about 50° C., a copolymer of an acrylate ester of a chlorinated aliphatic alcohol and divinyl benzene with a member selected from the group consisting of alkali and alkaline earth hydrosulfides in such amounts that about equimolar quantities of chlorine radical and hydrosulfide radical are present, whereby chlorine radicals in the alcohol moiety of the ester are replaced by mercapto groups.

5. An ion exchange resin as in claim 4 wherein said copolymer is a copolymer of chloromethylmethacrylate and divinylbenzene.

6. A method for preparing an ion exchange resin which comprises contacting, at about 50° C., a member selected from the group consisting of homopolymers of acrylate esters of a chlorinated aliphatic alcohol and copolymers of said esters with divinyl benzene, with a member selected from the group consisting of alkali and alkaline earth hydrosulfides in such amounts that about equimolar quantities of chlorine radical and hydrosulfide radical are present, whereby chlorine radicals in the alcohol moiety of the ester are replaced by mercapto groups.

7. A method according to claim 6 wherein said hydrosulfide is contacted with the polymer while the latter is in solution.

8. A method according to claim 6 wherein said hydrosulfide is contacted with the polymer while the latter is swollen.

9. A method according to claim 6 wherein said hydrosulfide is contacted with the polymer while the former is in alcoholic solution.

10. A method according to claim 6 wherein said ester is chloromethylacrylate.

11. A method according to claim 6 wherein said ester is chloromethylmethacrylate.

12. A method according to claim 6 wherein said hydrosulfide is an alkali hydrosulfide.

13. A method according to claim 12 wherein said hydrosulfide is potassium hydrosulfide.

14. A method for preparing an ion exchange resin which comprises contacting, at about 50° C., a copolymer of an acrylate ester of a chlorinated aliphatic alcohol and divinyl benzene, with a member selected from the group consisting of alkali and alkaline earth hydrosulfides in such amounts that about equimolar quantities of chlorine radical and hydrosulfide radical are present, whereby chlorine radicals in the alcohol moiety of the ester are replaced by mercapto groups.

15. A method as in claim 14 wherein said ester is chloromethylmethacrylate.

References Cited in the file of this patent

UNITED STATES PATENTS

| | | |
|---|---|---|
| 2,378,535 | Brubaker | June 19, 1945 |
| 2,563,662 | Rothrock | Aug. 7, 1951 |
| 2,671,072 | Ham | Mar. 2, 1954 |

OTHER REFERENCES

Gregor: J. Am. Chem. Soc., 77, 3675 (1955).